April 5, 1960    J. KIECHLE    2,931,238
HYDRAULIC GEAR SHIFT SYSTEMS
Filed June 5, 1956
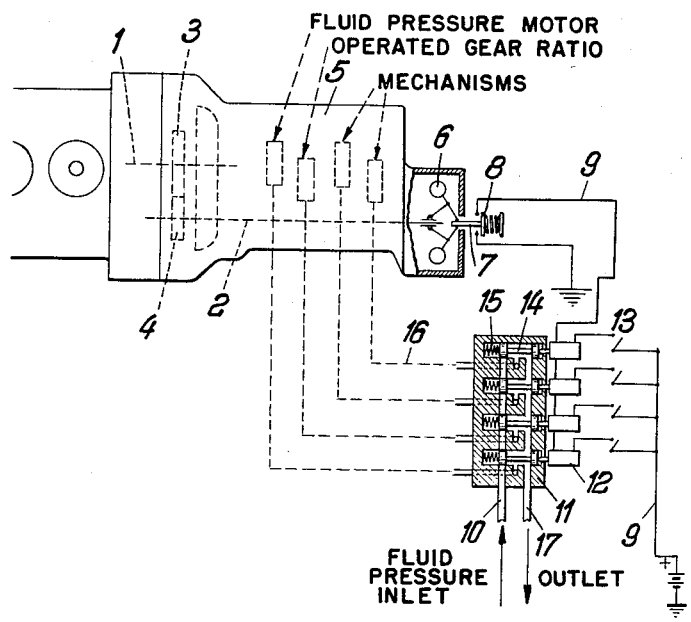
Inventor:
JULIUS KIECHLE,
BY Parry & Hine
ATTORNEYS

United States Patent Office 2,931,238
Patented Apr. 5, 1960

2,931,238

HYDRAULIC GEAR SHIFT SYSTEMS

Julius Kiechle, Friedrichshafen, Germany, assignor to Zahnradfabrik Friedrichshafen, Friedrichshafen am Bodensee, Germany Application June 5, 1956, Serial No. 589,395

Claims priority, application Germany June 10, 1955

1 Claim. (Cl. 74—336.5)

This invention relates to gear transmissions and more particularly to transmissions operated by hydraulic motors wherein each gear stage is operated by a separate and individually controllable hydraulic motor.

It is an object of the invention to provide a system for automatically disengaging any engaged gear of a transmission when the speed of the engine falls below a predetermined value. It is another object of the invention to provide a simple and reliable system operated directly from the main drive shaft for effecting gear disengagement.

My invention finds utility as a safety device for uncoupling the engine from the traction wheels of a vehicle under circumstances of downhill travel when the wheels are turning faster than the engine and damage to the latter could occur should rotation of the engine be forced against some blocking or drag effect, e.g., overheating or other conditions.

Briefly, my novel system comprises the combination of a governor operated switch which controls a series of bypass valves disposed in the fluid pressure lines to the gear engaging hydraulic motors. When the engine slows down to a predetermined degree, the governor, which is engine driven, serves to open the switch which in turn de-energizes a plurality of solenoids which control opening and closing of the valves. The valves have respective control switches for effecting energization of respective solenoids, which open the valves by selection of the operator to send fluid pressure to respective hydraulic motors in the transmission, or close the valves to effect bypass from the hydraulic motors to a sump. The governor controlled switch controls current in a common bus to the individual selector switches and accordingly opens the circuit to all such switches at any speed for which the governor may be set to be effective.

Referring now to the drawing, there is illustrated a main transmission shaft 1 which drives an auxiliary shaft 2 through a pair of gears 3 and 4, all contained in a transmission housing 5. A flyball governor 6 is driven by shaft 2 which, in a readily understood manner actuates a rod 7 to effect opening of a switch 8 when the speed of shaft 1 (and thus shaft 2) falls to a predetermined minimum. Switch 8 controls current in a common bus 9 to a plurality of parallel manual switches 13 which control current to respective solenoids 12.

A valve block 11 is provided having a series of reciprocal spool valves 14 which are biased against the force of respective solenoids 12 by springs 15.

Each solenoid 12 controls a valve spool 14 biased by a respective spring 15 to closing position wherein fluid pressure from a line 10 is directed via respective outlet lines 16 to respective gear stage hydraulic motors which may operate gear drive clutches. The hydraulic motor and associated mechanisms are indicated by dashed lines within the housing 5. A return line 17 in the valve housing 11 serves as a common fluid return from the several valve chambers. Thus in the illustration the valve spools 14 are positioned to direct flow from respective hydraulic motors to the return line 17, corresponding to a condition of disengagement of all gears.

Each solenoid 12 has a manual control switch 13. Accordingly, at normal engine speeds with switch 8 closed, any switch 13 may be actuated to energize a respective solenoid which effects movement of the corresponding valve spool, compressing the respective spring 15, so as to direct pressure fluid to a particular gear stage motor via a conduit 16. However, should the engine speed decrease to a point where switch 8 opens, current to all switches 13 is cut off thus effecting disengagement of any engaged gear.

Having described my invention, I am aware that various changes could be made without departing from the spirit thereof and therefore I do not seek to be limited to the precise illustration herein given except as set forth in the appended claim.

I claim:

In a control system for an engine and transmission having a plurality of selective gear ratios, and having a drive shaft and having means comprising hydraulic motors for effecting the transmission of driving torque through respective gear ratios, the improvement which comprises a valve for controlling flow of fluid pressure to each motor, selective means for opening each valve, and transmission disengagement means comprising a speed responsive means driven by said engine to close said valves at a predetermined lower limit of speed of said drive shaft, each of said valves having a spring and being biased to closed position thereby, each valve having a solenoid and a manual switch for energizing said solenoid to open said valve, said switches being selectively operable and having a common current bus, said transmission disengagement means comprising a switch in series with said bus, said switch being opened by said speed responsive means to cut off current to said selective switches at said lower limit of speed.

References Cited in the file of this patent

UNITED STATES PATENTS

| | | |
|---|---|---|
| 1,818,910 | Sanine | Aug. 11, 1931 |
| 2,251,213 | Lanphere | July 29, 1941 |